US007670520B2

(12) United States Patent
Dubey

(10) Patent No.: US 7,670,520 B2
(45) Date of Patent: Mar. 2, 2010

(54) MULTI-LAYER PROCESS FOR PRODUCING HIGH STRENGTH FIBER-REINFORCED STRUCTURAL CEMENTITIOUS PANELS WITH ENHANCED FIBER CONTENT

(75) Inventor: Ashish Dubey, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 505 days.

(21) Appl. No.: 11/591,793

(22) Filed: Nov. 1, 2006

(65) Prior Publication Data

US 2007/0110970 A1 May 17, 2007

Related U.S. Application Data

(63) Continuation-in-part of application No. 10/666,294, filed on Sep. 18, 2003, now Pat. No. 7,445,738.

(51) Int. Cl.
*B29C 70/06* (2006.01)
*B29C 70/30* (2006.01)

(52) U.S. Cl. ....................... 264/128; 264/308; 264/333; 264/172.19; 156/42

(58) Field of Classification Search ....................... None
See application file for complete search history.

(56) References Cited

U.S. PATENT DOCUMENTS

| | | | | |
|---|---|---|---|---|
| 2,446,644 | A | 8/1948 | Fischer | |
| 3,115,431 | A | 12/1963 | Stokes et al. | |
| 3,214,311 | A | 10/1965 | Schwab et al. | |
| 3,284,980 | A | 11/1966 | Dinkel | |
| 3,289,371 | A * | 12/1966 | Pearson et al. | 52/338 |
| 3,615,979 | A | 10/1971 | Davis et al. | |
| 3,972,972 | A * | 8/1976 | Yano et al. | 264/117 |
| 4,203,788 | A | 5/1980 | Clear | |
| 4,298,413 | A | 11/1981 | Teare | |
| 4,344,804 | A | 8/1982 | Bijen et al. | |
| 4,379,729 | A | 4/1983 | Cross | |
| 4,420,295 | A | 12/1983 | Clear et al. | |
| 4,450,022 | A | 5/1984 | Galer | |
| 4,450,128 | A | 5/1984 | Takeuchi | |
| 4,504,335 | A | 3/1985 | Galer | |
| RE32,037 | E | 11/1985 | Clear | |
| RE32,038 | E | 11/1985 | Clear et al. | |
| 4,666,029 | A | 5/1987 | Bürkner | |
| 4,778,718 | A | 10/1988 | Nicholls | |
| 4,793,892 | A | 12/1988 | Miller et al. | |
| 4,816,091 | A | 3/1989 | Miller | |

(Continued)

FOREIGN PATENT DOCUMENTS

| | | |
|---|---|---|
| JP | 51-115523 | 10/1976 |

OTHER PUBLICATIONS

Shah, Ludirdja, Daniel and Mobasher; Toughness-Durability of Glass Fiber Reinforced Concrete Systems; ACI Materials Journal, Sep.-Oct. 1988; pp. 352-360.

(Continued)

*Primary Examiner*—Edmund H. Lee
(74) *Attorney, Agent, or Firm*—Greer, Burns & Crain, Ltd.; David F. Janci, Esq.; Pradip Sahu, Esq.

(57) ABSTRACT

A process for producing fiber-reinforced structural cementitious panels made of at least one layer of fiber reinforced cementitious slurry, the process for each such layer of slurry including providing a moving web; depositing a first layer of individual, loose fibers upon the web; depositing a layer of settable slurry upon the deposited first layer of individual, loose fibers; depositing a second layer of individual, loose fibers upon the deposited layer of settable slurry; and actively embedding both layers of individual, loose fibers into the layer of slurry to distribute the fibers throughout the slurry.

18 Claims, 4 Drawing Sheets

U.S. PATENT DOCUMENTS

| | | | |
|---|---|---|---|
| 5,221,386 | A | 6/1993 | Ensminger et al. |
| 5,961,900 | A | 10/1999 | Wedi |
| 6,176,920 | B1 | 1/2001 | Murphy et al. |
| 2001/0000738 | A1 | 5/2001 | Mathieu |
| 2004/0084127 | A1 | 5/2004 | Porter |
| 2004/0218462 | A1 | 11/2004 | Stephens |
| 2004/0231916 | A1 | 11/2004 | Englert et al. |
| 2005/0061237 | A1 | 3/2005 | Dubey et al. |
| 2005/0064055 | A1 | 3/2005 | Porter |
| 2005/0064164 | A1 | 3/2005 | Dubey et al. |
| 2005/0121131 | A1 | 6/2005 | Hennis et al. |
| 2005/0155689 | A1 | 7/2005 | Smolenski |
| 2005/0219941 | A1 | 10/2005 | Christenson et al. |
| 2006/0147681 | A1 | 7/2006 | Dubey |
| 2006/0168906 | A1 | 8/2006 | Tonyan et al. |
| 2006/0174572 | A1 | 8/2006 | Tonyan et al. |

OTHER PUBLICATIONS

Mobasher and Shah; Test Parameters for Evaluating Toughness of Glass-Fiber Reinforced Concrete Panels; ACI Materials Journal, Sep.-Oct. 1989; pp. 448-458.

* cited by examiner

MULTI-LAYER PROCESS FOR PRODUCING HIGH STRENGTH FIBER-REINFORCED STRUCTURAL CEMENTITIOUS PANELS WITH ENHANCED FIBER CONTENT

CROSS REFERENCE TO RELATED APPLICATIONS

This application is a continuation-in-part of U.S. patent application Ser. No. 10/666,294 filed Sep. 18, 2003 for MULTI-LAYER PROCESS AND APPARATUS FOR PRODUCING HIGH STRENGTH FIBER-REINFORCED STRUCTURAL CEMENTITIOUS PANELS, now U.S. Pat. No. 7,445,738 and is related to: U.S. Pat. No. 6,986,812 entitled SLURRY FEED APPARATUS FOR FIBER-REINFORCED STRUCTURAL CEMENTITIOUS PANEL PRODUCTION; U.S. Ser. No. 10/665,541 entitled EMBEDMENT DEVICE FOR FIBER-ENHANCED SLURRY filed on Sep. 18, 2003, now U.S. Pat. No. 7,182,589; U.S. Pat. No. 7,513,768 entitled EMBEDMENT ROLL DEVICE; U.S. Pat. No. 7,513,963 entitled METHOD FOR WET MIXING CEMENTITIOUS SLURRY FOR FIBER-REINFORCED STRUCTURAL CEMENT PANELS; U.S. patent application Ser. No. 11/555,647 entitled PROCESS AND APPARATUS FOR FEEDING CEMENTITIOUS SLURRY FOR FIBER-REINFORCED STRUCTURAL CEMENT PANELS, U.S. Pat. No. 7,524,386 entitled METHOD FOR WET MIXING CEMENTITIOUS SLURRY FOR FIBER-REINFORCED STRUCTURAL CEMENT PANELS; U.S. patent application Ser. No. 11/555,658 entitled APPARATUS AND METHOD FOR WET MIXING CEMENTITIOUS SLURRY FOR FIBER-REINFORCED STRUCTURAL CEMENT PANELS; U.S. patent application Ser. No. 11/555,661 entitled PANEL SMOOTHING PROCESS AND APPARATUS FOR FORMING A SMOOTH CONTINUOUS SURFACE ON FIBER-REINFORCED STRUCTURAL CEMENT PANELS; and U.S. patent application Ser. No. 11/555,665entitled WET SLURRY THICKNESS GAUGE AND METHOD FOR USE OF SAME; and all herein incorporated by reference.

FIELD OF THE INVENTION

This invention relates to a continuous process and related apparatus for producing structural panels using a settable slurry, and more specifically, to a process for manufacturing reinforced cementitious panels, referred to herein as structural cementitious panels (SCP) (also known as structural cement panels), in which discrete fibers are combined with a quick-setting slurry for providing flexural strength and toughness. The invention also relates to a SCP panel produced according to the present process.

Cementitious panels have been used in the construction industry to form the interior and exterior walls of residential and/or commercial structures. The advantages of such panels include resistance to moisture compared to standard gypsum-based wallboard. However, a drawback of such conventional panels is that they do not have sufficient structural strength to the extent that such panels may be comparable to, if not stronger than, structural plywood or oriented strand board (OSB).

Typically, the present state-of-the-art cementitious panels include at least one hardened cement or plaster composite layer between layers of a reinforcing or stabilizing material. In some instances, the reinforcing or stabilizing material is continuous fiberglass mesh or the equivalent, while in other instances, short, discrete fibers are used in the cementitious core as reinforcing material. In the former case, the mesh is usually applied from a roll in sheet fashion upon or between layers of settable slurry. Examples of production techniques used in conventional cementitious panels are provided in U.S. Pat. Nos. 4,420,295; 4,504,335 and 6,176,920, the contents of which are incorporated by reference herein. Further, other gypsum-cement compositions are disclosed generally in U.S. Pat. Nos. 5,685,903; 5,858,083 and 5,958,131.

One drawback of conventional processes for producing cementitious panels that utilize building up of multiple layers of slurry and discrete fibers to obtain desired panel thickness is that the discrete fibers introduced in the slurry in a mat or web form, are not properly and uniformly distributed in the slurry, and as such, the reinforcing properties that essentially result due to interaction between fibers and matrix vary through the thickness of the board, depending on the thickness of each board layer and a number of other variables. When insufficient penetration of the slurry through the fiber network occurs, poor bonding and interaction between the fibers and the matrix results, leading to low panel strength development. Also, in extreme cases when distinct layering of slurry and fibers occurs, improper bonding and inefficient distribution of fibers causes inefficient utilization of fibers, eventually leading to extremely poor panel strength development.

Another drawback of conventional processes for producing cementitious panels is that the resulting products are too costly and as such are not competitive with outdoor/structural plywood or oriented strand board (OSB).

One source of the relatively high cost of conventional cementitious panels is due to production line downtime caused by premature setting of the slurry, especially in particles or clumps which impair the appearance of the resulting board, and interfere with the efficiency of production equipment. Significant buildups of prematurely set slurry on production equipment require shutdowns of the production line, thus increasing the ultimate board cost.

Thus, there is a need for a process and/or a related apparatus for producing fiber-reinforced cementitious panels which results in a board with structural properties comparable to structural plywood and OSB which reduces production line downtime due to prematurely set slurry particles. There is also a need for a process and/or a related apparatus for producing such structural cementitious panels which more efficiently uses component materials to reduce production costs over conventional production processes.

Furthermore, the above-described need for cementitious structural panels, also referred to as SCP's, that are configured to behave in the construction environment similar to plywood and OSB, means that the panels are nailable and can be cut or worked using conventional saws and other conventional carpentry tools. Further, the SCP panels should meet building code standards for shear resistance, load capacity, water-induced expansion and resistance to combustion, as measured by recognized tests, such as ASTM E72, ASTM 661, ASTM C 1185 and ASTM E136 or equivalent, as applied to structural plywood sheets.

BRIEF DESCRIPTION OF THE INVENTION

The above-listed needs are met or exceeded by the present invention that features a multi-layer process for producing structural cementitious panels (SCP's or SCP panels), and SCP's produced by such a process. After one of an initial deposition of loosely distributed, chopped fibers or a layer of slurry upon a moving web, fibers are deposited upon the slurry layer. An embedment device thoroughly mixes the recently deposited fibers into the slurry so that the fibers are distributed throughout the slurry, after which additional layers of slurry, then chopped fibers are added, followed by more embedment. The process is repeated for each layer of the panel, as desired. Upon completion, the board has a more evenly distributed fiber component, which results in relatively strong panels without the need for thick mats of reinforcing fibers, as are taught in prior art production techniques for cementitious panels. In addition, the resulting panel is optionally provided with increased amount of fibers per slurry layer than in prior panels.

In a preferred embodiment, multiple layers of chopped individual loose fibers are deposited relative to each layer of deposited slurry. The preferred sequence is that a layer of loose fibers are deposited, upon either the moving web or existing slurry, followed by a layer of slurry, then another layer of fibers. Next, the fiber/slurry/fiber combination is subjected to embedding to thoroughly mix the fibers in the slurry. This procedure has been found to permit the incorporation and distribution of a relatively larger amount of slurry fibers throughout the slurry using fewer slurry layers. Thus, panel production equipment and processing time can be reduced, while providing an SCP panel with enhanced strength characteristics.

More specifically, a process is provided for producing structural cementitious panels made of at least one layer of fiber reinforced cementitious slurry, the process for each such layer of slurry including providing a moving web; depositing a first layer of individual, loose fibers upon the web; depositing a layer of settable slurry upon the deposited first layer of individual, loose fibers, depositing a second layer of individual, loose fibers upon the deposited layer of settable slurry; and actively embedding both layers of individual, loose fibers into the layer of slurry to distribute the fibers throughout the slurry.

In another embodiment, an apparatus for producing a multi-layered structural cementitious panel includes a conveyor-type frame supporting a moving web; a first loose fiber distribution station in operational relationship to the frame and is configured for depositing loose fibers upon the moving web; a first slurry feed station in operational relationship to the frame and configured for depositing a thin layer of settable slurry upon the moving web so that the fibers are covered. A second loose fiber distribution station is provided in operational relationship to the frame and is configured for depositing loose fibers upon the slurry. An embedment device is in operational relationship to the frame and is configured for generating a kneading action in the slurry to embed the fibers into the slurry.

In yet another embodiment, a process is provided for making fiber-embedded cementitious panels, comprising:

using a first formula:

$$S^P_{f1,l} = \frac{4V_{f,l}t_l}{\pi(1+X_f)d_f}$$

for determining a projected fiber surface area fraction of a first fiber layer to be deposited in each settable slurry layer of the resulting panel;

using a second formula:

$$S^P_{f2,l} = \frac{4X_f V_{f,l}t_l}{\pi(1+X_f)d_f}$$

for determining a projected fiber surface area fraction of a second fiber layer to be deposited in each settable slurry layer of the resulting panel;

providing a desired slurry volume fraction $V_f$ of a percentage of the fibers in the fiber-reinforced slurry layer;

adjusting at least one of the fiber diameter $d_f$, and a fiber-reinforced slurry layer thickness $t_l$ in the range of 0.05-0.35 inches (0.127-00.889 cm), and further apportioning the volume fraction $V_f$ of fibers into a proportion $X_f$ of the supply of fibers comparing the fibers in the second layer to the fibers in the first fiber layer so that the fiber surface area fraction $S_{f1,l}^P$ and the fiber surface area fraction $S_{f2,l}^P$ for each fiber layer is less than 0.65;

providing a supply of loose, individual fibers according to the above-calculated fiber surface area fraction $S_{f1,l}^P$;

providing a moving web;

depositing the first layer of loose, individual fibers upon the web;

depositing a layer of settable slurry upon the first layer of individual, loose fibers;

depositing the second layer of loose, individual fibers upon the layer of settable slurry; and embedding the loose, individual fibers in the slurry so that the multiple layers of fibers are distributed throughout each slurry layer in the panel.

DETAILED DESCRIPTION OF THE INVENTION

Figure 1:
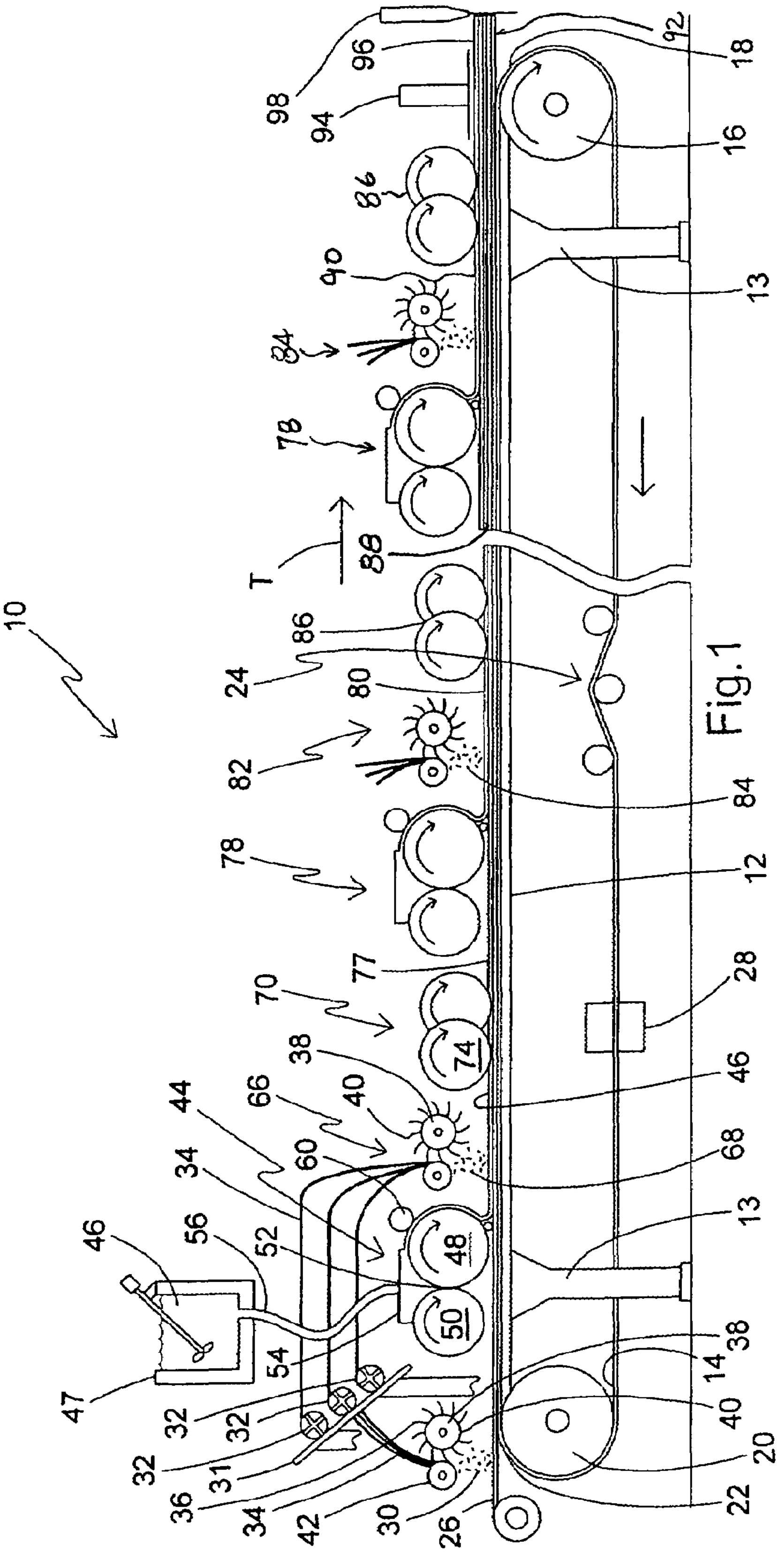
FIG. 1 is a diagrammatic elevational view of an apparatus which is suitable for performing the present process.

Referring now to FIG. 1, a structural panel production line is diagrammatically shown and is generally designated 10. The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13. The support frame 12 also includes a main drive roll 16 at a distal end 18 of the frame, and an idler roll 20 at a proximal end 22 of the frame. Also, at least one belt tracking and/or tensioning device 24 is preferably provided for maintaining a desired tension and positioning of the carrier 14 upon the rolls 16, 20.

Also, in the preferred embodiment, a web 26 of kraft paper, release paper, and/or other webs of support material designed for supporting a slurry prior to setting, as is well known in the art, may be provided and laid upon the carrier 14 to protect it and/or keep it clean. However, it is also contemplated that the panels produced by the present line 10 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the application.

In the present invention, structural cementitious panel production is initiated by one of depositing a layer of loose, chopped fibers 30 or a layer of slurry upon the web 26. An-advantage of depositing the fibers 30 before the first deposition of slurry is that fibers will be embedded near the outer surface of the resulting panel. A variety of fiber depositing and chopping devices are contemplated by the present line 10, however the preferred system employs at least one rack 31 holding several spools 32 of fiberglass cord, from each of which a cord 34 of fiber is fed to a chopping station or apparatus, also referred to as a chopper 36.

The chopper 36 includes a rotating bladed roll 38 from which project radially extending blades 40 extending transversely across the width of the carrier 14, and which is disposed in close, contacting, rotating relationship with an anvil roll 42. In the preferred embodiment, the bladed roll 38 and the anvil roll 42 are disposed in relatively close relationship such that the rotation of the bladed roll 38 also rotates the anvil roll 42, however the reverse is also contemplated. Also, the anvil roll 42 is preferably covered with a resilient support material against which the blades 40 chop the cords 34 into segments. The spacing of the blades 40 on the roll 38 determines the length of the chopped fibers. As is seen in FIG. 1, the chopper 36 is disposed above the carrier 14 near the proximal end 22 to maximize the productive use of the length of the production line 10. As the fiber cords 34 are chopped, the fibers 30 fall loosely upon the carrier web 26.

Next, a slurry feed station, or a slurry feeder 44 receives a supply of slurry 46 from a remote mixing location 47 such as a hopper, bin or the like. It is also contemplated that the process may begin with the initial deposition of slurry upon the carrier 14. While a variety of settable slurries are contemplated, the present process is particularly designed for producing structural cementitious panels. As such, the slurry is preferably comprised of varying amounts of Portland cement, gypsum, aggregate, water, accelerators, plasticizers, foaming agents, fillers and/or other ingredients well known in the art, and described in the patents listed above which have been incorporated by reference. The relative amounts of these ingredients, including the elimination of some of the above or the addition of others, may vary to suit the application.

While various configurations of slurry feeders 44 are contemplated which evenly deposit a thin layer of slurry 46 upon the moving carrier 14, the preferred slurry feeder 44 includes a main metering roll 48 disposed transversely to the direction of travel of the carrier 14. A companion or back up roll 50 is disposed in close parallel, rotational relationship to the metering roll 48 to form a nip 52 therebetween. A pair of sidewalls 54, preferably of non-stick material such as Teflon® brand material or the like, prevents slurry 46 poured into the nip 52 from escaping out the sides of the feeder 44.

An important feature of the present invention is that the feeder 44 deposits an even, relatively thin layer of the slurry 46 upon the moving carrier 14 or the carrier web 26. Suitable layer thicknesses range from about 0.05 inch to 0.20 inch (0.127-0.5 cm). However, with four layers preferred in the preferred structural panel produced by the present process, and a suitable building panel being approximately 0.5 inch (1.27 cm), an especially preferred slurry layer thickness is approximately 0.125 inch (0.3175 cm).

Figure 2:
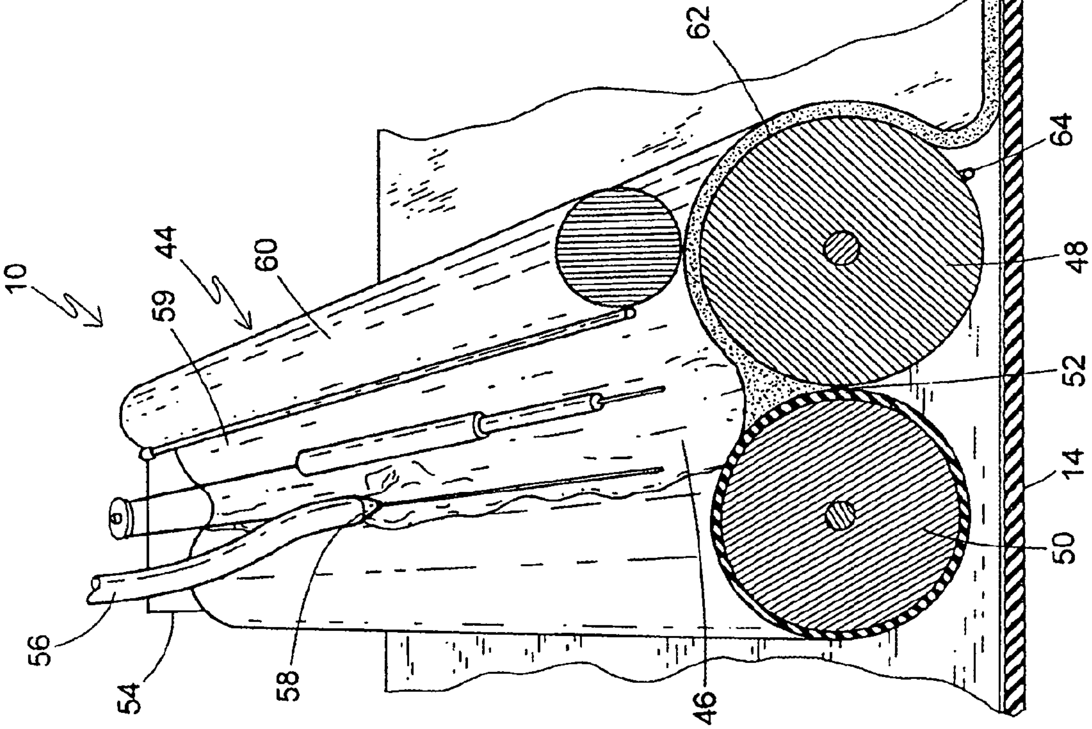
FIG. 2 is a perspective view of a slurry feed station of the type used in the present process.

Referring now to FIGS. 1 and 2, to achieve a slurry layer thickness as described above, several features are provided to the slurry feeder 44. First, to ensure a uniform disposition of the slurry 46 across the entire web 26, the slurry is delivered to the feeder 44 through a hose 56 located in a laterally reciprocating, cable driven, fluid powered dispenser 58 of the type well known in the art. Slurry flowing from the hose 56 is thus poured into the feeder 44 in a laterally reciprocating motion to fill a reservoir 59 defined by the rolls 48, 50 and the sidewalls 54. Rotation of the metering roll 48 thus draws a layer of the slurry 46 from the reservoir.

Next, a thickness monitoring or thickness control roll 60 is disposed slightly above and/or slightly downstream of a vertical centerline of the main metering roll 48 to regulate the thickness of the slurry 46 drawn from the feeder reservoir 59 upon an outer surface 62 of the main metering roll. Another related feature of the thickness control roll 60 is that it allows handling of slurries with different and constantly changing viscosities. The main metering roll 48 is driven in the same direction of travel 'T' as the direction of movement of the carrier 14 and the carrier web 26, and the main metering roll 48, the backup roll 50 and the thickness monitoring roll 60 are all rotatably driven in the same direction, which minimizes the opportunities for premature setting of slurry on the respective moving outer surfaces. As the slurry 46 on the outer surface 62 moves toward the carrier web 26, a transverse stripping wire 64 located between the main metering roll 48 and the carrier web 26 ensures that the slurry 46 is completely deposited upon the carrier web and does not proceed back up toward the nip 52 and the feeder reservoir 59. The stripping wire 64 also helps keep the main metering roll 48 free of prematurely setting slurry and maintains a relatively uniform curtain of slurry.

A second chopper station or apparatus 66, preferably identical to the chopper 36, is disposed downstream of the feeder 44 to deposit a second layer of fibers 68 upon the slurry 46. In the preferred embodiment, the chopper apparatus 66 is fed cords 34 from the same rack 31 that feeds the chopper 36. However, it is contemplated that separate racks 31 could be supplied to each individual chopper, depending on the application.

Figure 3:
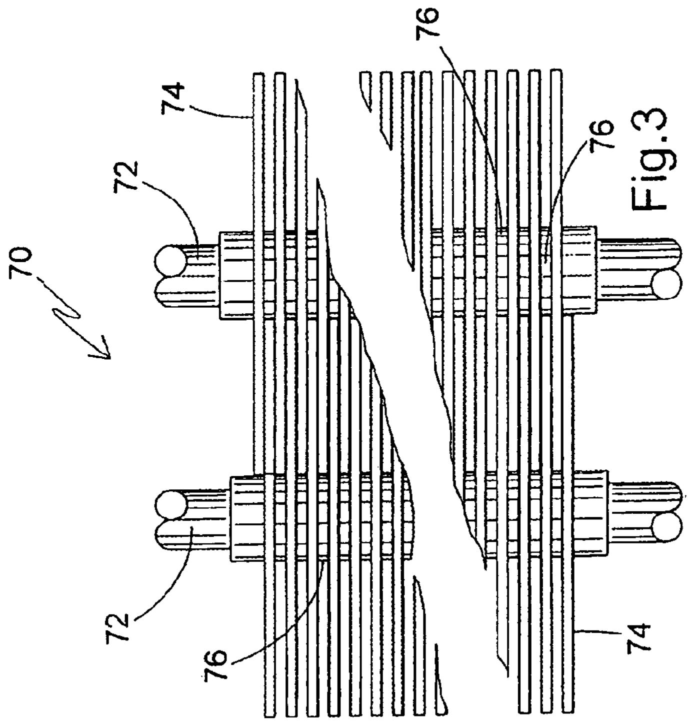
FIG. 3 is a fragmentary overhead plan view of an embedment device suitable for use with the present process.

Referring now to FIGS. 1 and 3, next, an embedment device, generally designated 70 is disposed in operational relationship to the slurry 46 and the moving carrier 14 of the production line 10 to embed the fibers 68 into the slurry 46. While a variety of embedment devices are contemplated, including, but not limited to vibrators, sheep's foot rollers and the like, in the preferred embodiment, the embedment device 70 includes at least a pair of generally parallel shafts 72 mounted transversely to the direction of travel 'T' of the carrier web 26 on the frame 12. Each shaft 72 is provided with a plurality of relatively large diameter disks 74 which are axially separated from each other on the shaft by small diameter disks 76.

During SCP panel production, the shafts 72 and the disks 74, 76 rotate together about the longitudinal axis of the shaft. As is well known in the art, either one or both of the shafts 72 may be powered, and if only one is powered, the other may be driven by belts, chains, gear drives or other known power transmission technologies to maintain a corresponding direction and speed to the driving roll. The respective disks 74, 76 of the adjacent, preferably parallel shafts 72 are intermeshed with each other for creating a "kneading" or "massaging" action in the slurry, which embeds the fibers 68 previously deposited thereon. In addition, the close, intermeshed and rotating relationship of the disks 74, 76 prevents the buildup of slurry 46 on the disks, and in effect creates a "self-cleaning" action which significantly reduces production line downtime due to premature setting of clumps of slurry.

The intermeshed relationship of the disks 74, 76 on the shafts 72 includes a closely adjacent disposition of opposing peripheries of the small diameter spacer disks 76 and the relatively large diameter main disks 74, which also facilitates the self-cleaning action. As the disks 74, 76 rotate relative to each other in close proximity (but preferably in the same direction), it is difficult for particles of slurry to become caught in the apparatus and prematurely set. By providing two sets of disks 74 which are laterally offset relative to each other, the slurry 46 is subjected to multiple acts of disruption, creating a "kneading" action which further embeds the fibers 68 in the slurry 46.

Once the fibers 68 have been embedded, or in other words, as the moving carrier web 26 passes the embedment device 70, a first layer 77 of the SCP panel is complete. In the preferred embodiment, the height or thickness of the first layer 77 is in the approximate range of 0.05-0.20 inch (0.127-0.5 cm). This range has been found to provide the desired strength and rigidity when combined with like layers in a SCP panel. However, other thicknesses are contemplated depending on the application.

To build a structural cementitious panel of desired thickness, additional layers are needed. To that end, a second slurry feeder 78, which is substantially identical to the feeder 44, is provided in operational relationship to the moving carrier 14, and is disposed for deposition of an additional layer 80 of the slurry 46 upon the existing layer 77.

Next, an additional chopper 82, substantially identical to the choppers 36 and 66, is provided in operational relationship to the frame 12 to deposit a third layer of fibers 84 provided from a rack (not shown) constructed and disposed relative to the frame 12 in similar fashion to the rack 31. The fibers 84 are deposited upon the slurry layer 80 and are embedded using a second embedment device 86. Similar in construction and arrangement to the embedment device 70, the second embedment device 86 is mounted slightly higher relative to the moving carrier web 14 so that the first layer 77 is not disturbed. In this manner, the second layer 80 of slurry and embedded fibers is created.

Figure 4:
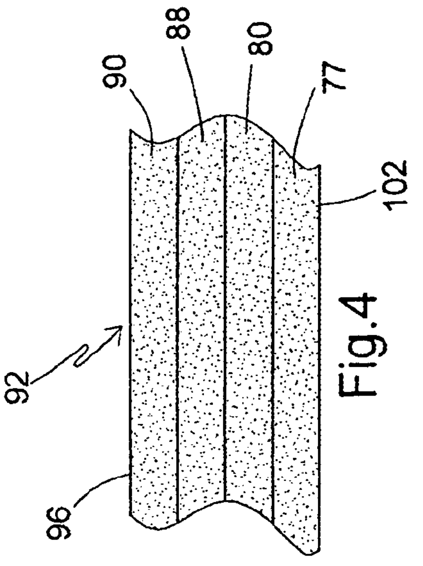
FIG. 4 is a fragmentary vertical section of a structural cementitious panel produced according to the present procedure.

Referring now to FIGS. 1 and 4, with each successive layer of settable slurry and fibers, an additional slurry feeder station 44, 78 followed by a fiber chopper 36, 66, 82 and an embedment device 70, 86 is provided on the production line 10. In the preferred embodiment, four total layers 77, 80, 88, 90 are provided to form the SCP panel 92. Upon the disposition of the four layers of fiber-embedded settable slurry as described above, a forming device 94 (FIG. 1) is preferably provided to the frame 12 to shape an upper surface 96 of the panel 92. Such forming devices 94 are known in the settable slurry/board production art, and typically are spring-loaded or vibrating plates which conform the height and shape of-the multi-layered panel to suit the desired dimensional characteristics. An important feature of the present invention is that the panel 92 consists of multiple layers 77, 80, 88, 90 which upon setting, form an integral, fiber-reinforced mass. Provided that the presence and placement of fibers in each layer are controlled by and maintained within certain desired parameters as is disclosed and described below, it will be virtually impossible to delaminate the panel 92 produced by the present process.

At this point, the layers of slurry have begun to set, and the respective panels 92 are separated from each other by a cutting device 98, which in the preferred embodiment is a water jet cutter. Other cutting devices, including moving blades, are considered suitable for this operation, provided that they can create suitably sharp edges in the present panel composition. The cutting device 98 is disposed relative to the line 10 and the frame 12 so that panels are produced having a desired length, which may be different from the representation shown in FIG. 1. Since the speed of the carrier web 14 is relatively slow, the cutting device 98 may be mounted to cut perpendicularly to the direction of travel of the web 14. With faster production speeds, such cutting devices are known to be mounted to the production line 10 on an angle to the direction of web travel. Upon cutting, the separated panels 92 are stacked for further handling, packaging, storage and/or shipment as is well known in the art.

Figure 5:
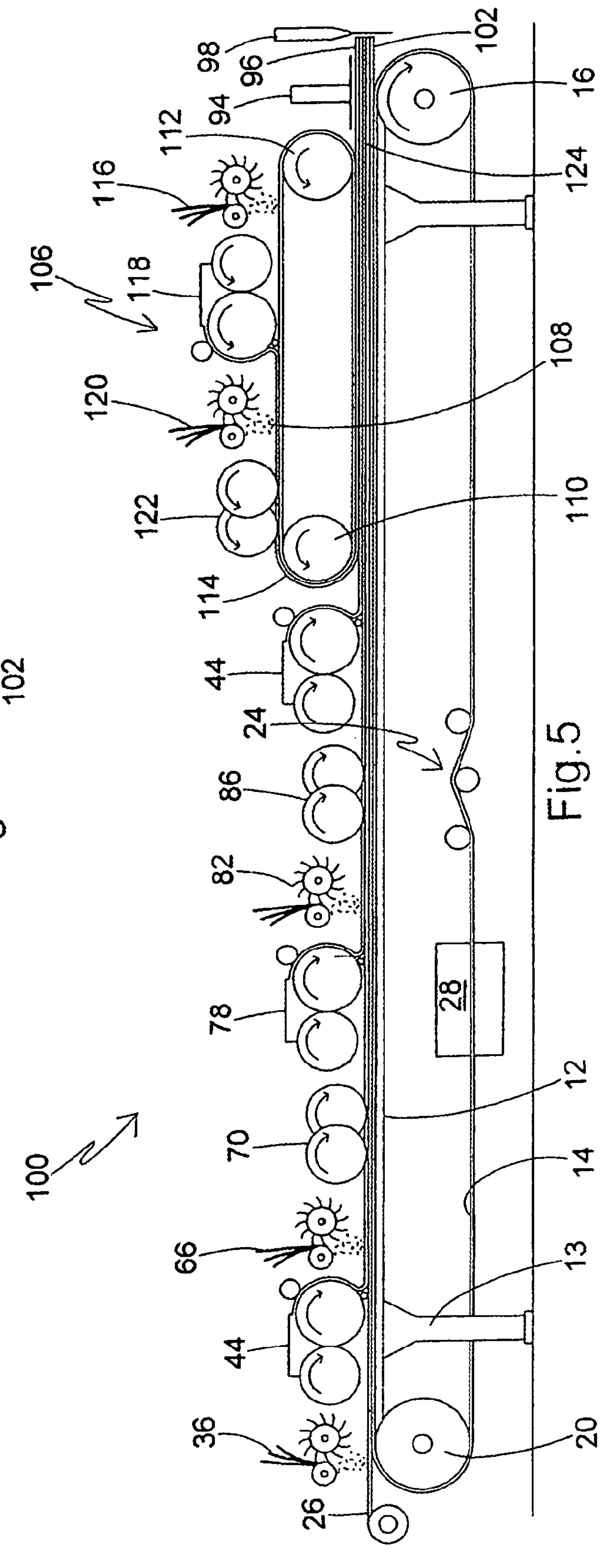
FIG. 5 is a diagrammatic elevational view of an alternate apparatus used to practice an alternate process to that embodied in FIG. 1.

Referring now to FIGS. 4 and 5, an alternate embodiment to the production line 10 is generally designated 100. The line 100 shares many components with the line 10, and these shared components have been designated with identical reference numbers. The main difference between the line 100 and the line 10 is that in the line 100, upon creation of the SCP panels 92, an underside 102 or bottom face of the panel will be smoother than the upper side or top face 96, even after being engaged by the forming device 94. In some cases, depending on the application of the panel 92, it may be preferable to have a smooth face and a relatively rough face. However, in other applications, it may be desirable to have a board in which both faces 96, 102 are smooth. Since the smooth texture is generated by the contact of the slurry with the smooth carrier 14 or the carrier web 26, to obtain a SCP panel with both faces or sides smooth, both upper and lower faces 96, 102 need to be formed against the carrier 14 or the release web 26.

To that end, the production line 100 includes sufficient fiber chopping stations 36, 66, 82, slurry feeder stations 44, 78 and embedment devices 70, 86 to produce at least four layers 77, 80, 88 and 90. Additional layers may be created by repetition of stations as described above in relation to the production line 10. However, in the production line 100, in the production of the last layer of the SCP panel, an upper deck 106 is provided having a reverse rotating web 108 looped about main rolls 110, 112 (one of which is driven) which deposits a layer of slurry and fibers 114 with a smooth outer surface upon the moving, multi-layered slurry 46.

More particularly, the upper deck 106 includes an upper fiber deposition station 116 similar to the fiber deposition station 36, an upper slurry feeder station 118 similar to the feeder station 44, a second upper fiber deposition station 120 similar to the chopping station 66 and an embedment device 122 similar to the embedment device 70 for depositing the covering layer 114 in inverted position upon the moving slurry 46. Thus, the resulting SCP panel 124 has smooth upper and lower surfaces 96, 102.

Another feature of the present invention is that the resulting SCP panel 92, 124 is constructed so that the fibers 30, 68, 84 are uniformly distributed throughout the panel. This has been found to enable the production of relatively stronger panels with relatively less, more efficient use of fibers. The volume fraction of fibers relative to the volume of slurry in each layer preferably constitutes approximately in the range of 1.5% to 3% by volume of the slurry layers 77, 80, 88, 90, 114.

Figure 6:
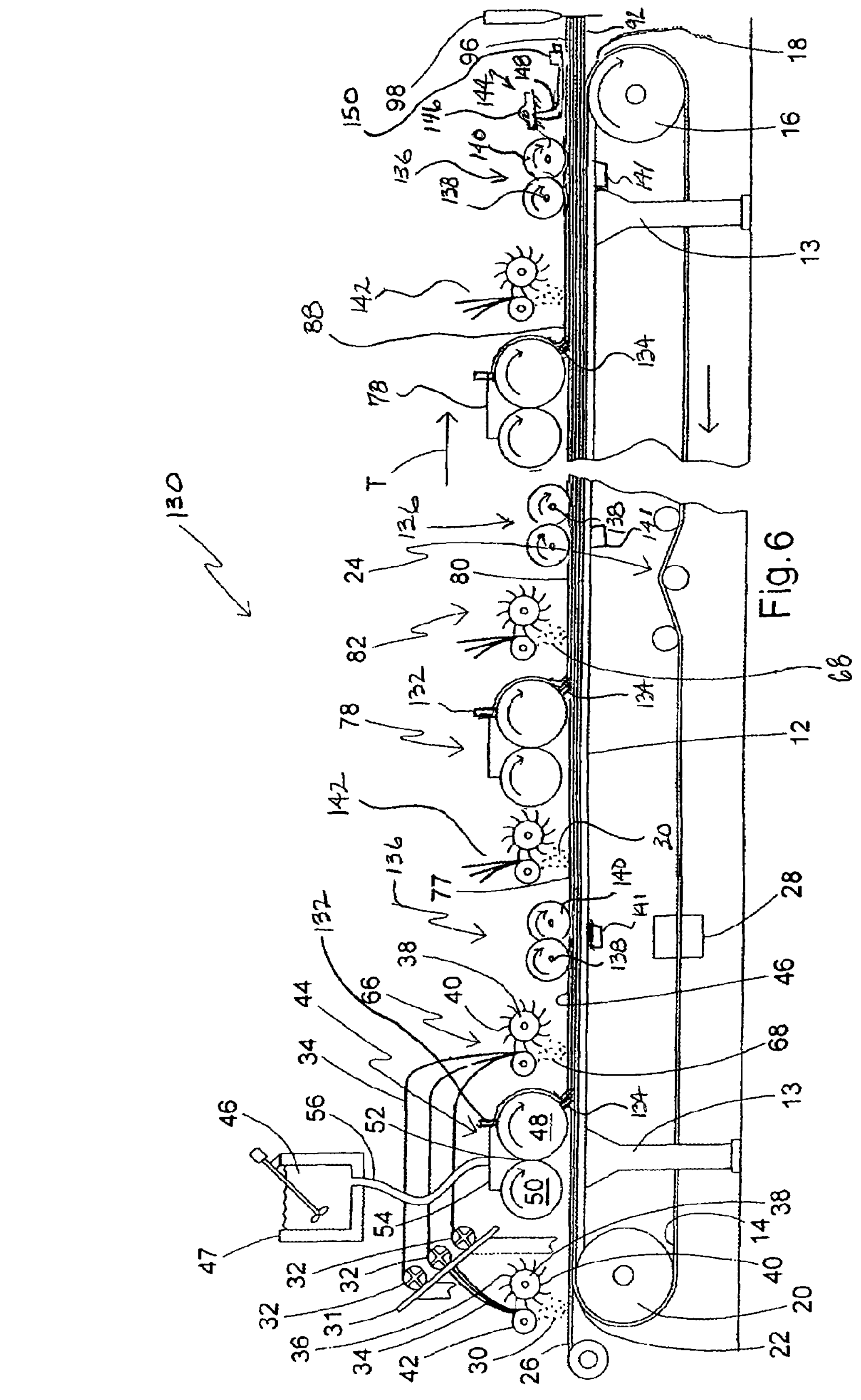
FIG. 6 is a diagrammatic elevational view of an alternate apparatus used to practice an alternate process.

Referring now to FIG. 6, it has been found in providing panels produced using the apparatus of FIGS. 1-5 that in some cases the number of fibers per slurry layer is unduly limited due to a perceived difficulty in properly embedding sufficient numbers of fibers for producing a satisfactorily strong SCP panel. Since the incorporation of a higher volume fraction of loose fibers distributed throughout the slurry is an important factor in obtaining desired panel strength, improved efficiency in incorporating such fibers is desirable. It is believed that the system depicted in FIGS. 1-5 in some cases requires excessive numbers of slurry layers to obtain an SCP panel having sufficient fiber volume fraction.

Accordingly, an alternate SCP panel production line or system is illustrated in FIG. 6 and is generally designated 130 for producing high-performance, fiber reinforced SCP panels incorporating a relatively high volume of fibers per slurry layer. In many cases, increased levels of fibers per panel are obtained using this system. While the system of FIGS. 1-5 discloses depositing a single discrete layer of fibers into each subsequent discrete layer of slurry deposited after the initial layer, the production line 130 includes a method of building up multiple discrete reinforcing fiber layers in each discrete slurry layer to obtain the desired panel thickness. Most preferably, the disclosed system embeds at least two discrete layers of reinforcing fibers, in a single operation, into an individual discrete layer of slurry. The discrete reinforcing fibers are embedded into the discrete layer of slurry using a suitable fiber embedment device.

More specifically, in FIG. 6 components used in the system 130 and shared with the system 10 of FIGS. 1-5 are designated with identical reference numbers, and the above description of those components is considered applicable here. Furthermore, it is contemplated that the apparatus described in relation to FIG. 6 may be combined with that of FIGS. 1-5 in a retrofit manner, and it is also contemplated that the system 130 of FIG. 6 may be provided with the upper deck 106 of FIG. 5.

In the alternate system 130, SCP panel production is initiated by depositing a first layer of loose, chopped fibers 30 upon the web 26. Next, the slurry feed station, or the slurry feeder 44 receives a supply of slurry 46 from the remote mixing location 47 such as a hopper, bin or the like. A suitable mixing apparatus with a vertical mixing chamber is described in commonly assigned, U.S. Pat. No. 7,524,386, entitled METHOD FOR WET MIXING CEMENTITIOUS SLURRY FOR FIBER-REINFORCED STRUCTURAL CEMENT PANELS which is incorporated by reference. Other mixing chamber improvements are disclosed in commonly assigned, copending U.S. Ser. No. 11/555,658 entitled APPARATUS AND METHOD FOR WET MIXING CEMENTITIOUS SLURRY FOR FIBER-REINFORCED STRUCTURAL CEMENT PANELS which is also incorporated by reference. It is contemplated that the slurry 46 in this embodiment is the same as that used in the production line 10 of FIGS. 1-5.

Also, the slurry feeder 44 is basically the same, including the main metering roll, 48 and the back up roll 50 to form the nip 52 and having the sidewalls 54. Suitable layer thicknesses range from about 0.05 inch to 0.35 inch (0.127-00.889 cm). For instance, for manufacturing a nominal ¾" (10.889 cm) thick structural panel, four slurry layers are preferred with an especially preferred slurry layer thickness of less than approximately 0.25 inch (.635 cm) in the preferred structural panel produced by the present process.

Referring to FIGS. 2 and 6, the slurry 46 is delivered to the feeder 44 through the hose 56 located in the laterally reciprocating, cable driven, fluid powered dispenser 58. Slurry flowing from the hose 56 is thus poured into the feeder 44 in a laterally reciprocating motion to fill the reservoir or headbox 59 defined by the rolls 48, 50 and the. sidewalls 54. Rotation of the metering roll 48 thus draws a layer of the slurry 46 from the reservoir.

The system 130 is preferably provided with a vibrating gate 132 which meters slurry onto the deposition or metering roll 48. By vibrating, the gate 132 prevents significant buildup in the corners of the headbox 59 and provides a more uniform and thicker layer of slurry than was provided without vibration. The gate 132 is described in greater detail in commonly assigned copending application U.S. Ser. No. 11/555,647; entitled PROCESS AND APPARATUS FOR FEEDING CEMENTITIOUS SLURRY FOR FIBER-REINFORCED STRUCTURAL CEMENT PANELS which is incorporated by reference.

Even with the addition of the vibrating gate 132, the main metering roll 48 and the backup roll 50 are rotatably driven in the same direction of travel 'T' as the direction of movement of the carrier 14 and the carrier web 26 which minimizes the opportunities for premature setting of slurry on the respective moving outer surfaces.

As the slurry 46 on the outer surface 62 of the main metering roll 48 moves toward the carrier web 26, a spring biased doctor blade 134 is provided which separates the slurry from the main metering roll 48 and deposits the slurry onto the moving web 26. An improvement over the stripping wire 64, the doctor blade 134 provides the slurry 46 with a direct path down to within about 1.5 inches (3.81 cm) of the carrier web 26, allowing an unbroken curtain of slurry to be continuously deposited onto the web or forming line, which is important to producing homogeneous panels. Additional details of the doctor blade 134 are provided in copending, commonly assigned U.S. Ser. No. 11/555,647 entitled PROCESS AND APPARATUS FOR FEEDING CEMENTITIOUS SLURRY FOR FIBER-REINFORCED STRUCTURAL CEMENT PANELS which is incorporated by reference.

A second chopper station or apparatus 66, preferably identical to the chopper 36, is disposed downstream of the feeder 44 to deposit a second layer of fibers 68 upon the slurry 46. In the preferred embodiment, the chopper apparatus 66 is fed cords 34 from the same rack 31 that feeds the chopper 36. However, it is contemplated that separate racks 31 could be supplied to each individual chopper, depending on the application.

Referring again to FIG. 6, next, an embedment device, generally designated 136 is disposed in operational relationship to the slurry 46 and the moving carrier 14 of the production line 130 to embed the first and second layers of fibers 30, 68 into the slurry 46. While a variety of embedment devices are contemplated, including, but not limited to vibrators, sheep's foot rollers and the like, in the preferred embodiment, the embedment device 136 is similar to the embedment device 70 with the exception that the overlap of the adjacent shafts 138 have been decreased to the range of approximately 0.5 inch (1.27 cm). Also, the number of disks 140 has been reduced, and the disks are substantially thicker than that shown in FIG. 3. In addition, there is a tighter spacing or clearance between adjacent overlapping disks 140 of adjacent shafts 138, on the order of 0.010 to 0.018 inches (0.025-0.045 cm), to prevent fibers from becoming lodged between adjacent disks. Further details of the embedment device 136 are found in commonly assigned U.S. Pat. No. 7,513,768, entitled EMBEDMENT ROLL DEVICE which is incorporated by reference. Otherwise, the embedment device 136 provides the same sort of kneading action as the device 70, with the objective of embedding or thoroughly mixing the fibers 30, 68 within the slurry 46.

To further enhance the embedment of the fibers 30, 68 into the slurry 46, it is preferred that at each embedment device 136 the frame 12 is provided with at least one vibrator 141 in operational proximity to the carrier web 14 or the paper web

26 to vibrate the slurry 46. Such vibration has been found to more uniformly distribute the chopped fibers 30, 68 throughout the slurry 46. Conventional vibrator devices are deemed suitable for this application.

As seen in FIG. 6, to implement the present system 130 of multiple layers of fibers 30, 68 for each layer of slurry 46, additional chopping stations 142 are provided between the embedment device 136 and subsequent feeder boxes 78, so that for each layer of slurry 46, fibers 30, 68 are deposited before and after deposition of the slurry. This improvement has been found to enable the introduction of significantly more fibers into the slurry and accordingly increase the strength of the resulting SCP panel. In the preferred embodiment, while only three are shown, four total layers of combined slurry and fiber are provided to form the SCP panel 92.

Upon the disposition of the four layers of fiber-embedded settable slurry as described above, a forming device such as a vibrating shroud 144 is preferably provided to the frame 12 to shape an upper surface 96 of the panel 92. By applying vibration to the slurry, the shroud 144 facilitates the distribution of the fibers 30, 68 throughout the panel 92, and provides a more uniform upper surface 96. The shroud 144 includes a mounting stand 146, a flexible sheet 148 secured to the mounting stand, a stiffening member extending the width of the sheet (not shown) and a vibration generator 150 preferably located on the stiffening member to cause the sheet to vibrate. Additional details of the vibrating shroud 144 are provided in commonly assigned, copending U.S. Ser. No. 11/555,661 entitled PANEL SMOOTHING PROCESS AND APPARATUS FOR FORMING A SMOOTH CONTINUOUS SURFACE ON FIBER-REINFORCED STRUCTURAL CEMENT PANELS which is incorporated by reference. Other forming devices are contemplated, as are described above and otherwise known in the art.

An important feature of the present invention is that the panel 92 consists of multiple layers 77, 80, 88, 90 which upon setting, form an integral, fiber-reinforced mass. Provided that the presence and placement of fibers in each layer are controlled by and maintained within certain desired parameters as is disclosed and described below, it will be virtually impossible to delaminate the panel 92 produced by the present process.

Utilizing two discrete layers of reinforcing fibers with each individual discrete slurry layer provides the following benefits. First, splitting the total amount of fibers to be incorporated in the slurry layer into two or more discrete fiber layers reduces the respective amount of fibers in each discrete fiber layer. Reduction in the amount of fibers in the individual discrete fiber layer enhances efficiency of embedment of fibers into the slurry layer. Improved fiber embedment efficiency in turn results in superior interfacial bond and mechanical interaction between the fibers and the cementitious matrix.

Next, a greater amount of reinforcing fibers can be incorporated into each slurry layer by utilizing multiple discrete layers of reinforcing fibers. This is due to the finding that the ease of embedment of the fibers into the slurry layer has been found to depend upon the total surface area of the fibers in the discrete fiber layer. Embedment of the fibers in the slurry layer becomes increasingly difficult as the amount of fibers in the discrete fiber layer increases, causing an increase in the surface area of the fibers to be embedded in the slurry layer. It has been found that when the total surface area of the fibers in the discrete fiber layer reaches a critical value, embedment of the fibers into the slurry layers becomes almost impossible. This imposes an upper limit on the amount of fibers that can successfully be incorporated in the discrete layer of slurry. For a given total amount of fibers to be incorporated in the discrete slurry layer, use of multiple discrete fiber layers reduces the total surface area of the fibers in each discrete fiber layer. This reduction in the fiber surface area (brought about by the use of multiple discrete fiber layers) in turn provides an opportunity to increase the total amount of fibers that can successfully be embedded into the discrete layer of slurry.

In addition, the use of multiple discrete fiber layers allows tremendous flexibility with respect to the distribution of fibers through the panel thickness. The amount of fibers in the individual discrete fiber layers may be varied to achieve desired objectives. The resulting creation of a "sandwich" construction is greatly facilitated with the presence of a larger number of discrete fiber layers. Panel configurations with fiber layers having higher amount of fibers near the panel skins and lower amount of fibers in the fiber layers near the panel core are particularly preferred from both product strength and cost optimization perspectives.

In quantitative terms, the influence of the number of fiber and slurry layers, the volume fraction of fibers in the panel, and the thickness of each slurry layer, and fiber strand diameter on fiber embedment efficiency has been investigated and established as part of the present system 130. A mathematical treatment for the concept of projected fiber surface area fraction for the case involving two discrete fiber layers and one discrete slurry layer is introduced and derived below. It has been found that it is virtually impossible to embed fibers in the slurry layer if the projected fiber surface area fraction of the discrete fiber layer exceeds a value of 1.0. Although the fibers may be embedded when the projected fiber surface area fraction falls below 1.0, the best results are obtained when the projected fiber surface area fraction is less than 0.65. When the projected fiber surface area fraction ranges between 0.65 and 1.00, the efficiency and ease of fiber embedment varies with best fiber embedment at 0.65 and worst at 1.00. Another way of considering this fraction is that approximately 65% of a surface of the slurry is covered by fibers.

Let, $v_t$=Total volume of a fundamental fiber-slurry layer $v_{f,l}$=Total fiber volume/layer $v_{f1}$=Volume of fiber in discrete fiber layer 1 of a fundamental fiber-slurry layer $v_{f2}$=Volume of fiber in discrete fiber layer 2 of a fundamental fiber-slurry layer $v_{s,l}$=Volume of slurry in a fundamental fiber-slurry layer $V_{f,l}$=Total volume fraction of fibers in a fundamental fiber-slurry layer $d_f$=Diameter of individual fiber strand $l_f$=Length of individual fiber strand $t_l$=Total thickness of individual layer including slurry and fibers $t_{s,l}$=Slurry layer thickness in a fundamental fiber-slurry layer $X_f$=Ratio of layer 2 fiber volume to layer 1 fiber volume of a fundamental fiber-slurry layer $n_{f,l}$, $n_{f1,l}$, $n_{f2,l}$=Total number of fibers in a fiber layer $s_{f,l}^P$, $s_{f1,l}^P$, $s_{f2,l}^P$=Total projected surface area of fibers contained in a fiber layer $S_{f,l}^P$, $S_{f1,l}^P$, $S_{f2,l}^P$=Projected fiber surface area fraction for a fiber layer To determine the projected fiber surface area fraction for a fiber layer in an arrangement of a fiber layer/slurry layer/fiber layer sandwich composed of one discrete slurry layer and two discrete fiber layers, the following relationship is derived.

Let,

The volume of the slurry layer be equal to $v_{s,l}$

The volume of the fibers in the layer 1 be equal to $v_{f1}$

The volume of the fibers in the layer 2 be equal to $v_{f2}$

The total volume fraction of fibers in the fundamental fiber-slurry layer be equal to $V_{f,1}$ The total thickness of the fundamental fiber-slurry layer be equal to $t_l$ The thickness of the slurry layer be equal to $t_{s,l}$ Let, The total volume of fibers (i.e., fibers in layer 1 and layer 2) be equal to $v_{f,l}$:

$$v_{f,l}=v_{f1}+V_{f2} \tag{1}$$

and, $$\frac{v_{f2}}{v_{f1}} = X_f \tag{2}$$

Let,

The total volume of the fundamental fiber-slurry layer, $v_t$=Total volume of slurry layer+Total volume of the two fiber layers=

$$v_{s,l}+v_{f,l}=v_{s,l}+v_{f1}+v_{f2} \tag{3}$$

Combining (1) and (2):

$$v_{f1} = \frac{v_{f,l}}{(1+X_f)} \tag{4}$$

The total fiber volume of the fundamental fiber-slurry layer in terms of the total fiber volume fraction can be written as:

$$v_{f,l}=v_t*V_{f,l} \tag{5}$$

Thus, the volume of fibers in the layer 1 can be written as:

$$v_{f1} = \frac{v_t V_{f,l}}{(1+X_f)} \tag{6}$$

Similarly, the volume of fibers in the layer 2 can be written as:

$$v_{f2} = \frac{X_f v_t V_{f,l}}{(1+X_f)} \tag{7}$$

Assuming fibers to have cylindrical shape, the total number of fibers in the layer 1, $n_{f1,l}$ can be derived from Equation 6 as follows:

$$n_{f1,l} = \frac{4 v_t V_{f,l}}{\pi(1+X_f) d_f^2 l_f} \tag{8}$$

where, $d_f$ is the fiber strand diameter and $l_f$ is the fiber strand length

Similarly, the total number of fibers in the layer 2, $n_{f2,l}$ can be derived from Equation 7 as follows:

$$n_{f2,l} = \frac{4 X_f v_t V_{f,l}}{\pi(1+X_f) d_f^2 l_f} \tag{9}$$

The projected surface area of a cylindrical fiber is equal to the product of its length and diameter. Therefore, the total projected surface area of all fibers in layer 1, $s_{f1,l}^P$ can be derived as:

$$s_{f1,1}^P = n_{f1,l} * d_f * l_f = \frac{4 v_t V_{f,l}}{\pi(1+X_f) d_f} \tag{10}$$

Similarly, the total projected surface area of fibers in layer 2, $s_{f2,l}^P$ can be derived as:

$$s_{f2,l}^P = n_{f2,l} * d_f * l_f = \frac{4 X_f v_t V_{f,l}}{\pi(1+X_f) d_f} \tag{11}$$

The projected surface area of slurry layer, $s_{s,l}^P$ can be written as:

$$s_{s,l.}^P = \frac{v_{s,l}}{t_{s,l}} = \frac{v_t}{t_l} \tag{12}$$

Projected fiber surface area fraction of fiber layer 1, $S_{f1,l}^P$ is defined as follows:

$$S_{f1,l}^P = \frac{\text{Projected surface area of all fibers in layer 1, } s_{f1,l}^P}{\text{Projected surface area of the slurry layer, } s_{s,l}^P} \tag{13}$$

Combining Equations 10 and 12, the projected fiber surface area fraction of fiber layer 1, $S_{f1,l}^P$ can be derived as:

$$S_{f1,l}^P = \frac{4 V_{f,l} t_l}{\pi(1+X_f) d_f} \tag{14}$$

Similarly, combining Equations 11 and 12, the projected fiber surface area fraction of fiber layer 2, $S_{f2,l}^P$ can be derived as:

$$S_{f2,l}^P = \frac{4 X_f V_{f,l} t_l}{\pi(1+X_f) d_f} \tag{15}$$

Equations 14 and 15 depict dependence of the parameter projected fiber surface area fraction, $S_{f1,l}^P$ and $S_{f2,l}^P$ on several other variables in addition to the variable total fiber volume fraction, $V_{f,l}$. These variables are diameter of fiber strand, thickness of discrete slurry layer, and the amount (proportion) of fibers in the individual discrete fiber layers.

Experimental observations confirm that the embedment efficiency of a layer of fiber network laid over a cementitious slurry layer is a function of the parameter "projected fiber surface area fraction". It has been found that the smaller the projected fiber surface area fraction, the easier it is to embed the fiber layer into the slurry layer. The reason for good fiber embedment efficiency can be explained by the fact that the extent of open area or porosity in a layer of fiber network increases with decreases in the projected fiber surface area fraction. With more open area available, the slurry penetration through the layer of fiber network is augmented, which translates into enhanced fiber embedment efficiency.

Accordingly, to achieve good fiber embedment efficiency, the objective function becomes keeping the fiber surface area fraction below a certain critical value. It is noteworthy that by varying one or more variables appearing in the Equation 15, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

Based on this fundamental work, the preferred magnitudes of the projected fiber surface area fraction $S_{f1,l}^{P}$ have been discovered to be as follows:

| | |
|---|---|
| Preferred projected fiber surface area fraction, $S_{f1,l}^{P}$ | <0.65 |
| Most preferred projected fiber surface area fraction, $S_{f1,l}^{P}$ | <0.45 |

For a design panel fiber volume fraction, $V_f$, for example a percentage fiber volume content in each slurry layer of 1-5%, achievement of the aforementioned preferred magnitudes of projected fiber surface area fraction can be made possible by tailoring one or more of the following variables—total number of distinct fiber layers, thickness of distinct slurry layers, and fiber strand diameter. In particular, the desirable ranges for these variables that lead to the preferred magnitudes of projected fiber surface area fraction are as follows:

| Thickness of Distinct Slurry Layers. $t_{s,l}$ | |
|---|---|
| Preferred thickness of distinct slurry layers, $t_{s,l}$ | ≦0.35 inches (0.889 cm) |
| More Preferred thickness of distinct slurry layers, $t_{s,l}$ | ≦0.25 inches (.635 cm) |
| Most preferred thickness of distinct slurry layers, $t_{s,l}$ | ≦0.15 inches (.381 cm) |
| **Fiber Strand Diameter, $d_f$** | |
| Preferred fiber strand diameter, $d_f$ | ≧30 tex |
| Most preferred fiber strand diameter, $d_f$ | ≧70 tex |

EXAMPLES

Referring now to FIG. 4, a fragment of the panel 92 produced according to the present process and using the present system is shown to have four slurry layers, 77, 80, 88 and 90. This panel should be considered exemplary only, in that a panel 92 produced under the present system may have one or more layers. By using the above mathematical relationships, the slurry layers 77, 80, 88 and 90 can have different fiber volume fractions. For example, skin or face layers 77, 90 have a designated fiber volume fraction $V_f$ of 5%, while inner layers 80, 88 have a designated $V_f$ of 2%. This provides a panel with enhanced outer strength, and an inner core with comparatively less strength, which may be desirable in certain applications, or to conserve fibers for cost reasons. It is contemplated that the fiber volume fraction $V_f$ may vary among the layers 77, 80, 88, 90 to suit the application, as can the number of layers.

Also, modifications of the fiber content can be accomplished within each slurry layer. For example, with a fiber volume fraction $V_f$ of 5%, for example, fiber layer 1 optionally has a designated slurry volume fraction of 3% and fiber layer 2 optionally has a designated fiber volume fraction of 2%. Thus, $X_f$ will be 3/2.

Panels were manufactured using the system of FIG. 6 and using the above-described projected fiber surface area fraction formula. Panel thickness ranged from 0.5 to 0.82 inch (1.27-2.08cm). Individual slurry layer thicknesses ranged from 0.125 to 0.205 inch (0.3175-0.5207cm). Total fiber volume fraction $V_f$ ranged from 2.75-4.05%. In Panel 1, as described above in relation to FIG. 4, the outer fiber layers 1 and 8 had relatively higher volume fraction (%) as a function of total panel volume 0.75% v. 0.43% for inner layers, and the projected fiber surface area fraction ranged from 0.63 on the outer layers 1 and 8 and 0.36 on the inner layers 2 through 7. In contrast Panel 4 had the same volume fraction % of 0.50 for all fiber layers, and a similarly constant projected fiber surface area fraction of 0.42 for all fiber layers. It was found that all of the test panels had excellent fiber embedment. Interestingly, Panel 1, had only a slightly lower flexural strength than Panel 4, respectively 3401/3634 psi.

In the present system 130, by increasing the number of fiber layers, each with its own fiber surface area fraction, more fibers can be added to each slurry layer without requiring as many layers of slurry. Using the above process, the panel 92 can have the same thickness as prior panels, with the same number of fibers of the same diameter, with fewer number of slurry layers. Thus, the resulting panel 92 has layers of enhanced strength but is less expensive to produce, due to a shorter production line using less energy and capital equipment.

While a particular embodiment of the multi-layer process for producing high strength fiber-reinforced structural cement panels having enhanced fiber content has been shown and described, it will be appreciated by those skilled in the art that changes and modifications may be made thereto without departing from the invention in its broader aspects and as set forth in the following claims.

What is claimed is:

1. A process for producing structural cementitious panels made of at least one layer of fiber reinforced cementitious slurry, said process for each such layer of slurry comprising:

(a) providing a moving web;

(b) depositing a first layer of individual, loose fibers upon the web;

(c) depositing a layer of settable slurry upon the deposited first layer of individual, loose fibers;

(d) depositing a second layer of individual, loose fibers upon the deposited layer of settable slurry; and (e) actively embedding both said layers of individual, loose fibers into the layer of slurry to distribute the fibers throughout the slurry, wherein the respective proportion of fibers in the slurry layers produced by steps (b) through (e) is represented by a projected fiber surface area fraction less than 0.65.

2. The process of claim 1, further including repeating said process for applying a second layer of slurry upon said deposited layer, and wherein said step (b) is achieved by depositing said first layer of individual, loose fibers upon said deposited layer of slurry having embedded fibers.

3. The process of claim 2 further including repeating said process to create a structural cement panel having multiple discrete slurry layers, so that each discrete slurry layer is provided with at least two discrete layers of loose, individual fibers.

4. The process of claim 1 wherein no more than approximately 65% of a surface of said slurry is covered by said fibers.

5. The process of claim 1 further including forming said panel with a forming device.

6. The process of claim 1 further including vibrating the slurry and the fibers in association with said active embedment of step (e).

7. The process of claim 1 further including performing said active embedding step by creating a kneading action in said slurry.

8. The process of claim 1 further including producing the last of the layers with an upper deck and a reverse rotating web which deposits a layer of slurry and fibers with a smooth outer surface upon the moving, multi-layered slurry.

9. The process of claim 1 further including providing a carrier layer to said moving web.

10. The process of claim 1 wherein the fibers constitute approximately 1-5% by volume of each said slurry layer.

11. The process of claim 10 further including repeating said process for providing multiple slurry layers, each with a designated volume fraction of fibers by volume.

12. The process of claim 11 further including preparing a fiber reinforced panel with a pair of outer layers and at least one inner layer, said outer layers having a higher volume fraction of fibers than said at least one inner layer.

13. The process of claim 1 wherein the thickness of each such fiber reinforced slurry layer produced by steps (b)-(e) is in the approximate range of 0.05-0.35 inches.

14. A process for making fiber reinforced cementitious panels, comprising:

using a first formula:

$$S_{f1,l}^{P} = \frac{4V_{f,l}t_l}{\pi(1+X_f)d_f}$$

for determining a projected fiber surface area fraction of a first fiber layer to be deposited in each settable slurry layer of the resulting panel;

using a second formula:

$$S_{f2,l}^{P} = \frac{4X_fV_{f,l}t_l}{\pi(1+X_f)d_f}$$

for determining a projected fiber surface area fraction of a second fiber layer to be deposited in each settable slurry layer of the resulting panel;

providing a desired slurry volume fraction $V_f$ of a percentage of the fibers in the fiber-reinforced slurry layer;

adjusting at least one of the fiber diameter $d_f$, and a fiber-reinforced slurry layer thickness $t_l$ in the range of 0.05-0.35 inches, and further apportioning the volume fraction $V_f$ of fibers into a proportion $X_f$ of the supply of fibers comparing the fibers in the second layer to the fibers in the first fiber layer so that the fiber surface area fraction $S_{f1,l}^{P}$ and the fiber surface area fraction $S_{f2,l}^{P}$ for each fiber layer is less than 0.65;

determining a number of loose, individual fibers to add to each fiber layer by dividing the fiber surface area fraction $S_{f1,l}^{P}$ by the diameter of the fiber $d_f$ and the length of the fiber $l_f$;

providing a moving web;

depositing the first layer of loose, individual fibers upon the web based on the determined number of fibers to add to each fiber layer;

depositing a layer of settable slurry upon the first layer of individual, loose fibers;

depositing the second layer of loose, individual fibers upon the layer of settable slurry based on the determined number of fibers to add to each fiber layer; and embedding said loose, individual fibers in said slurry so that said multiple layers of fibers are distributed throughout each said slurry layer in said panel.

15. The process of claim 14 further including repeating said process for each additional slurry layer used in forming a multiple layer fiber reinforced cementitious panel, wherein said first deposition of fibers will be upon a predeposited slurry layer.

16. The process of claim 14 wherein the slurry volume fraction $V_f$ is at least 1.0% by volume of the fibers in each slurry layer.

17. The process of claim 14 wherein said fiber surface area fraction $S_{f1,l}^{P}$ and said fiber surface area fraction $S_{f2,l}^{P}$ for each fiber layer less than 0.45.

18. A process for producing structural cementitious panels made of at least one layer of fiber reinforced cementitious slurry, said process for each such layer of slurry comprising:

(a) providing a moving web;

(b) depositing a first layer of individual, loose fibers upon the web;

(c) depositing a layer of settable slurry upon the deposited first layer of individual, loose fibers;

(d) depositing a second layer of individual, loose fibers upon the deposited layer of settable slurry; and (e) actively embedding both said layers of individual, loose fibers into the layer of slurry to distribute the fibers throughout the slurry by creating a kneading action in said slurry.

* * * * *

UNITED STATES PATENT AND TRADEMARK OFFICE

CERTIFICATE OF CORRECTION

PATENT NO. : 7,670,520 B2
APPLICATION NO. : 11/591793
DATED : March 2, 2010
INVENTOR(S) : Ashish Dubey It is certified that error appears in the above-identified patent and that said Letters Patent is hereby corrected as shown below:

In the Specification:

In the Description:

In Column 4, Line 18, delete " $S_{f1,l}^{P}$ " and replace with -- $S_{f1,l}^{P}$ --;

In Column 4, Line 19, delete " $S_{f2,l}^{P}$ " and replace with -- $S_{f2,l}^{P}$ --;

In Column 4, Line 22, delete " $S_{f1,l}^{P}$ " and replace with -- $S_{f1,l}^{P}$ --;

In Column 12, Line 57, delete " $S_{f,l}^{P}$, $S_{f1,l}^{P}$, $S_{f2,l}^{P}$ " and replace with -- $S_{f,l}^{P}$, $S_{f1,l}^{P}$, $S_{f2,l}^{P}$ --;

In Column 12, Line 59, delete " $S_{f,l}^{P}$, $S_{f1,l}^{P}$, $S_{f2,l}^{P}$ " and replace with -- $S_{f,l}^{P}$, $S_{f1,l}^{P}$, $S_{f2,l}^{P}$ --;

In Column 14, Line 11, delete " $S_{f1,l}^{P}$ " and replace with -- $S_{f1,l}^{P}$ --;

In Column 14, Line 27, delete " $S_{s,l}^{P}$ " and replace with -- $S_{s,l}^{P}$ --;

In Column 14, Line 35, delete " $S_{f1,l}^{P}$ " and replace with -- $S_{f1,l}^{P}$ --;

In Column 14, Line 44, delete " $S_{f1,l}^{P}$ " and replace with -- $S_{f1,l}^{P}$ --;

In Column 14, Line 55, delete " $S_{f2,l}^{P}$ " and replace with -- $S_{f2,l}^{P}$ --;

In Column 14, Line 65, delete " $S_{f1,l}^{P}$ and $S_{f2,l}^{P}$ " and replace with -- $S_{f1,l}^{P}$ and $S_{f2,l}^{P}$ --;

In Column 15, Line 31, delete " $S_{f1,l}^{P}$ " and replace with -- $S_{f1,l}^{P}$ --;

In Column 15, Line 36, delete " $S_{f1,l}^{P}$ " and replace with -- $S_{f1,l}^{P}$ --;

In Column 15, Line 37, delete " $S_{f1,l}^{P}$ " and replace with -- $S_{f1,l}^{P}$ --;

In the Claims:

In Column 18, Line 13, delete " $S_{f1,l}^{P}$ and the fiber surface area fraction $S_{f2,l}^{P}$ " and replace with -- $S_{f1,l}^{P}$ and the fiber surface area fraction $S_{f2,l}^{P}$ --;

Signed and Sealed this
Third Day of June, 2014

Michelle K. Lee

Michelle K. Lee
*Deputy Director of the United States Patent and Trademark Office*

In Column 18, Line 17, delete " $S_{f1,l}^{P}$ " and replace with -- $S_{f1,l}^{P}$ --;

In Column 18, Line 42, delete " $S_{f1,l}^{P}$ said fiber surface area fraction $S_{f2,l}^{P}$ " and replace with -- $S_{f1,l}^{P}$ and said fiber surface area fraction $S_{f2,l}^{P}$ --;

In Column 18, Line 43, delete "layer less" and replace with --layer is less--;